Sept. 28, 1943.   E. S. CORNELL ET AL   2,330,686
TOOL SPINDLE WITH REMOVABLE PROJECTION
Filed Sept. 11, 1941
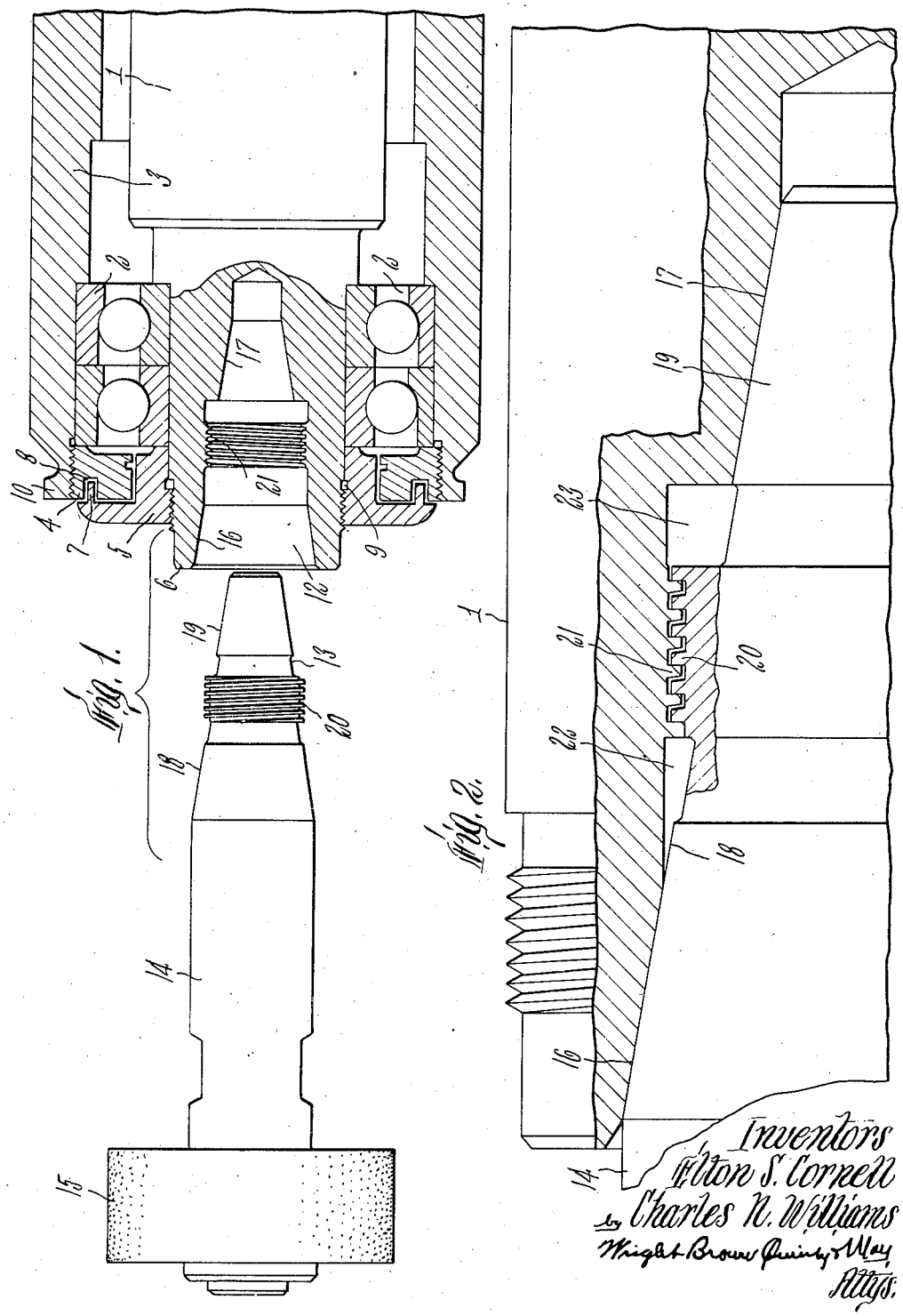
Inventors
Elton S. Cornell
Charles N. Williams
by Wright Brown Quinby & May
Attys.

Patented Sept. 28, 1943

2,330,686

UNITED STATES PATENT OFFICE 2,330,686

TOOL SPINDLE WITH REMOVABLE PROJECTION

Elton S. Cornell, Charlestown, N. H., and Charles N. Williams, Springfield, Vt., assignors to Bryant Chucking Grinder Company, Springfield, Vt., a corporation of Vermont Application September 11, 1941, Serial No. 410,424

10 Claims. (Cl. 287—125)

It is often desirable to removably attach projections coaxial with rotary spindles, as, for example, when it is desired to use different rotary tools for operating on work without requiring resetting or rechucking of the work, a tool being carried by each projection and the projections being interchanged as desired, or for economy to avoid the necessity of using individual separate spindles for each tool to be employed. It is important that such a projection shall be accurately coaxial with the spindle to which it is applied, and that it shall be readily removable for replacement by other projections. Where interfitting conical parts on the spindle and projection have been employed, if the taper is made long in an effort to obtain accurate concentricity, there is danger of the parts becoming so firmly united as to make separation extremely difficult. Attempts to remove the projection might then cause damage to the parts. This is particularly likely to happen if a cold projection be inserted into a hot spindle. As the projection warms up and expands, it sticks tightly in the spindle and as the temperatures of the spindle and projection while they are in mutual contact remain fairly close together, the parts thereafter remain tightly fixed. It is seldom possible to provide a hole through the spindle for the passage of an ejector rod for engagement and removal of the projection, and when provided it adds to the expense of the structure and may create too much unbalance for high speed spindles. If a relatively steep taper between the spindle and projection is employed to avoid undue sticking, the projection is more easily influenced by stresses such, for example, as from interengaging threaded portions on the spindle and projection for retaining purposes, so as to become misalined with the spindle. Threaded connections between the spindle and the projection of themselves do not afford the required accuracy of coaxial alinement, and the engagement of these threads may impose lateral forces tending further to prevent coaxial alinement of the spindle and spindle projection.

The present invention has for an object to provide mating spindle and projection constructions which will provide accurate coaxial relationship between these parts when assembled and will permit of ready detachment of the projection when desired and without the use of ejector rods or a hollow spindle. To this end the spindle and projection have mating axially spaced tapered portions for locating the projection coaxial to the spindle, and of sufficiently steep taper to avoid undue sticking, together with a threaded connection between these parts located between the tapered portions and so arranged as to cause positive axial relative motion of the parts on relative rotation thereof but without causing side thrusts tending to throw the parts out of proper alinement.

For a more complete understanding of this invention, reference may be had to the accompanying drawing in which Figure 1 is a fragmentary view partly broken away and in section of a spindle projection and with cooperating parts of the spindle and its mounting, the projection being shown withdrawn from the spindle.

Figure 2 is a fragmentary view to a larger scale of the cooperating parts of the spindle and projection and showing these parts in assembled relation.

Referring to the drawing, at 1 is indicated a spindle which is shown as supported for rotation in ball-bearings 2 from a supporting frame member 3. As shown this spindle is intended for supporting a rotary grinding wheel and in order to prevent grit and other foreign matter from reaching the bearings 2, sealing members comprising an annular sealing member 4 carried by the casing 3 and an annular sealing member 5 carried by a reduced diameter end portion 6 of the spindle have been illustrated. These ring portions 4 and 5 are arranged closely together but out of contact with each other and the member 5 may have an annular fin 7 which extends into an annular groove 8 of the member 4. The member 4 may also be provided with an internal groove 9. This arrangement effectively seals off the passage of foreign matter from outside the spindle into the bearings and at the same time permits free rotation of the spindle. The member 5 is shown as threaded for engagement with external threads in the portion 6 of the spindle and the annular member 4 is shown also as threaded into the internally threaded portion 10 of the casing 3.

The outer end of the spindle 1 is provided with a socket 12 within which may be extended the portion 13 of the projection 14 which is shown in Figure 1 as supporting a grinding wheel 15 at its outer end. This socket 12 has a pair of axially spaced tapered internal faces 16 and 17 and the portion 13 has matingly tapered axially spaced external surfaces 18 and 19. The angle of taper of the internal faces 16 and 17 of the spindle and the external faces 18 and 19 of the projection is sufficiently steep so that the projection is not liable to become too firmly wedged into the spindle socket 12 to prevent removal. For ground steel surfaces an angle of approximately 18° will usually be found satisfactory. Preferably, particularly for the purpose of providing for easy machining of the parts, the faces 16 and 17 and the faces 18 and 19, respectively, are arranged as portions of the same conical surface and the parts between the surfaces 16 and 17 are arranged at least as remote from the central axis as this cone surface. This permits these surfaces 16 and 17 to be taper ground in a grinding machine without requiring relative adjustments of the grinding wheel and the work in the wheel grinding strokes for finishing these axially spaced surfaces. For grinding the external surfaces 18 and 19 it is only necessary when using a single wheel to provide a cut away portion intermediate its length to clear the intermediate portion 20 which is of larger diameter than the large end of the surface 19.

This intermediate substantially coaxial cylindrical portion 20 between the externally tapered surfaces 18 and 19 of the projection is externally threaded to mate an internally threaded non-tapering substantially coaxial portion 21 of the socket 12 in the spindle. Preferably in order that the engagement of these threaded portions shall exert no undesirable side thrusts between the spindle and projection, thus to avoid tendency to force the projection out of true axial alinement with the spindle, the working side faces of the mating threads are steep as illustrated best in Figure 2 so as to produce by their engagement as small a lateral component of pressure as is practicable. They are shown as vertical on the tightening or working side so that there is no lateral pressure component. If as steep as the angle of repose, when they are brought into contact, no substantial lateral forces tending to distort the parts or throw them out of true axial alinement will be exerted. Likewise in order that the thrust exerted between these threaded portions shall be axial, they are formed non-centering so that they may float relatively as shown in Figure 2 up to the point where their confronting steep faces tightly engage, the centering effect being accomplished entirely by the tapered faces of the spindle socket and the projection and the threads of the two parts being out of contact with each other except at said steep faces. Where the angle of the thread faces is thus steep, any centering tendency as the thread faces come together, is overcome by the friction therebetween which prevents actual relative sliding motion between the two parts laterally of the axis. The term "steep side face" as applied to the threads and as used herein is defined as a side face which departs from perpendicular to the axis of the piece by not substantially more than the angle of repose of the surfaces in contact. It is not commercially possible to grind a thread face to exact perpendicularity to the work axis, but it may be ground to within five degrees from the perpendicular. Such five degree variation from perpendicular is in general use for modified square threads as recommended by the American Standards Committee and is within the angle of repose. Preferably the socket portion 12 is enlarged somewhat in certain axial zones to provide the clearance spaces 22 and 23 shown best in Figure 2, thus to further provide for the escape of any foreign matter which otherwise might tend to prevent proper contact between the tapered surfaces of the spindle and projection which are relied upon primarily to retain these parts in accurate coaxial relation. The threaded connections between the tapered engaging parts provide ready means for securing and detaching the projection with relation to the spindle, a slight rotation of the projection in one direction acting to free the projection locating faces from the mating locating faces on the spindle and rotation in the opposite direction serving to move these faces relatively into close controlling engagement accurately locating the projection in axial alinement with the spindle. The tapered bearing surfaces at opposite ends of the threaded engagement tend to produce high accuracy of coaxial alinement between the projection and spindle.

From the foregoing description of an embodiment of this invention, it should be evident to those skilled in the art that various modifications and changes might be made without departing from the spirit or scope of this invention.

We claim:

1. In combination, a spindle and a removable projection for said spindle, said spindle and projection having a pair of axially spaced cooperating tapered portions for locating said projection coaxial with said spindle, and interengaging cylindrical threaded portions of said spindle and projection located between said pairs of tapered portions for securing said projection to said spindle, said threaded portions having steep engaging side faces.

2. In combination, a spindle and a removable projection for said spindle, said spindle and projection having a pair of axially spaced cooperating tapered portions for locating said projection coaxial with said spindle, and interengaging cylindrical threaded portions of said spindle and projection located between said pairs of tapered portions for securing said projection to said spindle, said pairs of tapered portions lying in the same conical surface, said threaded portions having steep engaging side faces.

3. In combination, a spindle and a removable projection for said spindle, said spindle and projection having a pair of axially spaced cooperating tapered portions for locating said projection coaxial with said spindle, and interengaging cylindrical threaded portions of said spindle and projection located between said pairs of tapered portions for securing said projection to said spindle, said threaded portions having steep engaging side faces and being in non-centering relation to each other.

4. In combination, a spindle and a removable projection for said spindle, said spindle and projection having a pair of axially spaced cooperating tapered portions for locating said projection coaxial with said spindle, and interengaging cylindrical threaded portions of said spindle and projection located between said pairs of tapered portions for securing said projection to said spindle, said pairs of tapered portions lying in the same conical surface, said threaded portions having steep engaging side faces and being in non-centering relation to each other.

5. A spindle projection having a pair of axially spaced conical pilot portions with their surfaces forming parts of the same cone, and a substantially coaxial externally threaded cylindrical part between said portions having steep active thread faces.

6. A spindle having a coaxial socket in one end, said socket having a pair of axially spaced conical wall portions, and an internally threaded cylindrical portion in the space between said conical wall portions and having steep thread faces.

7. A spindle having a coaxial socket in one end, said socket having a pair of axially spaced conical wall portions, and an internally threaded substantially coaxial cylindrical portion in the space between said conical wall portions and having steep thread faces, said conical wall portions being portions of a single conical surface.

8. A spindle having a coaxial socket in one end, said socket having a pair of axially spaced conical wall portions, and an internally steep threaded substantially coaxial cylindrical portion in the space between said conical wall portions, said conical wall portions being portions of a single conical surface and no portion of said non-tapering portion extending inwardly of said single conical surface.

9. A spindle having a coaxial socket in one end, said socket having a pair of axially spaced conical wall portions, and an internally threaded portion in the space between said conical wall portions, said conical wall portions being portions of a single conical surface, said socket having clearance spaces between said threaded and conical wall portions of larger diameter than the corresponding parts of the single conical surface.

10. A spindle having a coaxial socket in one end, said socket having a pair of axially spaced concentric conical wall portions, and an extension having a pair of axially spaced concentric external conical surfaces mating the wall portions of said socket, said socket and extension having mating cylindrical threaded portions between their respective conical portions and conical surfaces, said threaded portions lying in radial non-centering relation and having steep working complemental faces.

ELTON S. CORNELL.
CHARLES N. WILLIAMS.